(No Model.)
I. F. KEARNS.
BURNER FOR GAS COOKING STOVES.
No. 393,764. Patented Dec. 4, 1888.
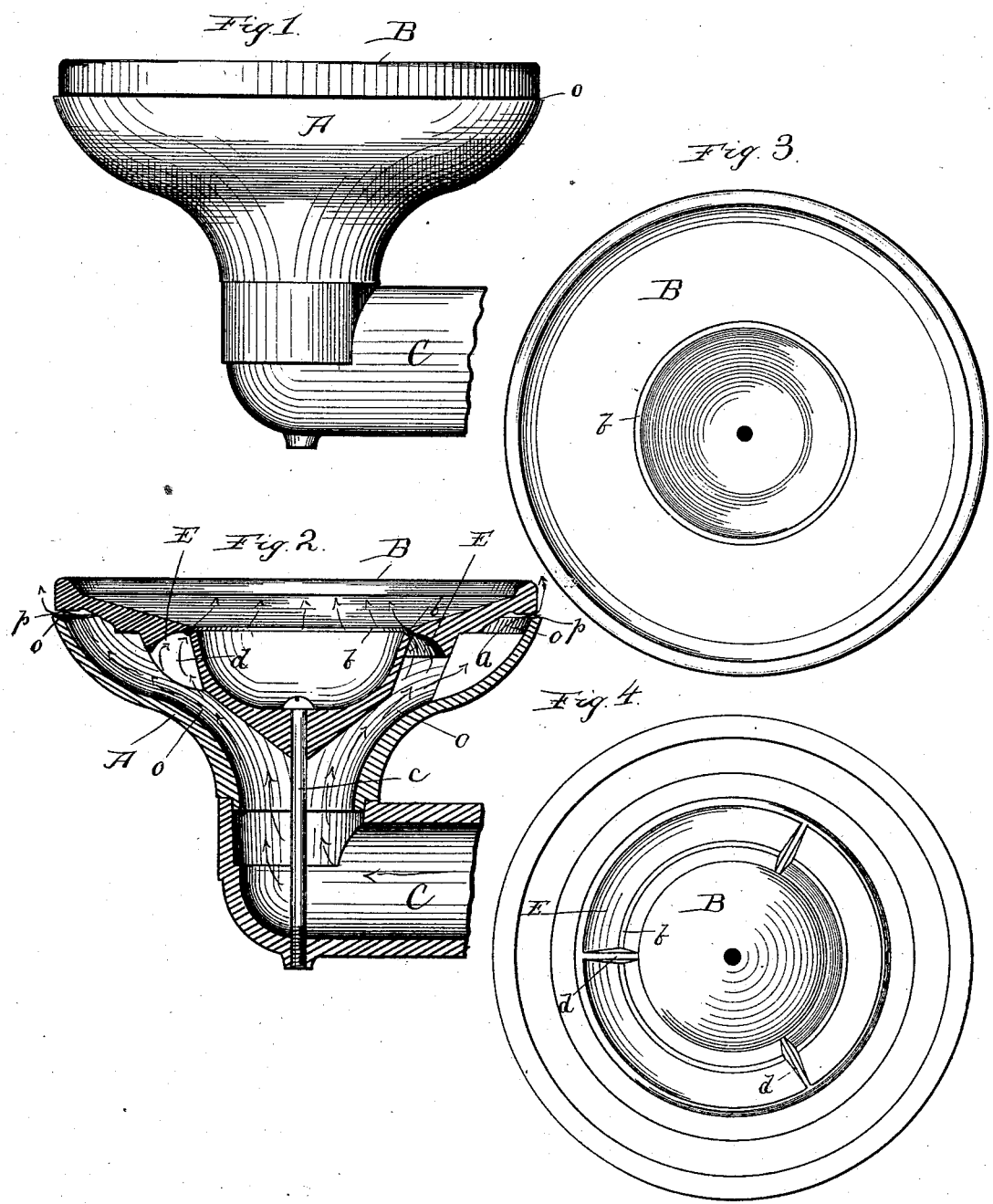
Witnesses:
Lew. C. Curtis.
H. W. Munday.
Inventor:
Isaac F. Kearns:
By Munday Evarts & Adcock,
his Attorneys.

UNITED STATES PATENT OFFICE.

ISAAC F. KEARNS, OF CHICAGO, ILLINOIS.

BURNER FOR GAS COOKING-STOVES.

SPECIFICATION forming part of Letters Patent No. 393,764, dated December 4, 1888.

Application filed January 9, 1888. Serial No. 260,195. (No model.)

*To all whom it may concern:*

Be it known that I, ISAAC F. KEARNS, a citizen of the United States, residing in Chicago, in the county of Cook and State of Illinois, have invented a new and useful Improvement in Burners for Gas Cooking-Stoves, of which the following is a specification.

This invention is an improvement upon the burner shown in patent to me of October 7, 1884, and numbered 306,082.

In my said previous invention the only outlet for the gas was at the annular opening between the outer margins of the two disks forming the burner. The disks are usually about three inches in diameter, and the result of the patented construction was that the flame all spread outwardly, leaving a circular space as large as the burner and immediately over it where there would be no flame at all, so that, while a cooking vessel placed over the burner would be thoroughly heated at its sides by the outwardly-spreading fire, there would be a portion of its bottom directly over the burner which would receive little or no heat. For many cooking operations this is an objection, and to obviate it is the purpose of my present invention, and such object is accomplished by providing the upper disk of the burner, as hereinafter specified, with a centrally-located annular slit through which the gas may issue, and thus insure the heating of the bottom of the cooking vessel equally with the sides and other portions lying beyond the periphery of the burner.

In the accompanying drawings, which form a part of this specification, and in which similar letters of reference indicate like parts, Figure 1 is a side elevation, and Fig. 2 a central vertical section, of my improved burner. Fig. 3 is a top and Fig. 4 a bottom view of the upper disk of the burner.

In said drawings, A and B represent the two inverted conically-shaped disks forming the burner; C, the air and gas mixing tube upon which they may be located, and *c* the screw by which they may be secured to said tube. The under disk, A, does not differ from the corresponding part shown in my said patent, and there is formed between the two disks a similar upwardly-inclined annular passage, *o*, terminating in a narrow slit, *p*, at the outer margin of the disks, and also corresponding to the same feature of the prior construction. The upper disk rests upon projections *a*, cast upon the inner surface of the disk A, the new burner resembling the old one in that respect also. The upper disk, B, is provided with a continuous or endless slit, *b*, near its center, formed by cutting through the thin shell of the disk while the latter is revolved in a lathe, and adapted to form a gas-burning orifice. In order to hold the central and outer parts of the disk, which would otherwise come apart by the cutting of this slit, I cast upon the disk B bridges or projecting ribs *d*, which span the slit, as illustrated. Through the slit *b* thus formed a portion of the gas and air escapes and burns at the center of the burner.

To insure the flow of the gas through the slit *b*, I find it very desirable, if not absolutely essential, to provide just beyond the slit a deflector which will arrest a portion of the escaping current of gas and air and direct it into the slit. Without some such device the current is apt to flow past the central slit to the marginal orifice instead of seeking exit at the slit in sufficient quantity to supply it. Such a deflector is shown at E. It is preferably annular, and may be cast upon the under surface of the disk.

I am aware that gasoline-burners have been provided with caps having horizontal marginal slits and a central top portion of lesser diameter also provided with a horizontal slit, all said slits serving to give egress to the vapor. Such construction does not embody my invention and is not claimed by me.

I claim—

In a gas-burner, the combination, with under disk, A, of upper disk, B, supported above disk A, with a marginal orifice between them, said disk B having a central slit, *b*, and a deflector, E, substantially as set forth.

ISAAC F. KEARNS.

Witnesses:
EDW. S. EVARTS,
H. M. MUNDAY.